US012140041B2

(12) United States Patent
Kislinger et al.

(10) Patent No.: US 12,140,041 B2
(45) Date of Patent: Nov. 12, 2024

(54) STATOR VANE FOR A TURBOMACHINE

(71) Applicant: MTU Aero Engines AG, Munich (DE)

(72) Inventors: Bernd Kislinger, Munich (DE); Markus Brettschneider, Munich (DE); Detlef Korte, Munich (DE); Klaus Wittig, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 18/166,504

(22) Filed: Feb. 9, 2023

(65) Prior Publication Data

US 2023/0258088 A1 Aug. 17, 2023

(30) Foreign Application Priority Data

Feb. 11, 2022 (DE) ........................ 102022103319.8

(51) Int. Cl.
*F01D 5/14* (2006.01)
*F01D 9/04* (2006.01)

(52) U.S. Cl.
CPC ............ *F01D 5/141* (2013.01); *F01D 9/041* (2013.01); *F05D 2240/121* (2013.01); *F05D 2240/122* (2013.01); *F05D 2240/80* (2013.01); *F05D 2250/38* (2013.01); *F05D 2250/71* (2013.01)

(58) Field of Classification Search
CPC ..... F01D 9/00; F01D 9/02; F01D 9/04; F01D 9/041; F01D 9/042; F01D 5/141; F01D 5/16; F05D 2240/80; F05D 2240/121; F05D 2240/122; F05D 2250/38; F05D 2250/71
See application file for complete search history.

(56) References Cited

U.S. PATENT DOCUMENTS

| | | | |
|---|---|---|---|
| 6,312,219 | B1 | 11/2001 | Wood et al. |
| 6,508,630 | B2 | 1/2003 | Liu et al. |
| 7,794,201 | B2 | 9/2010 | Burton et al. |
| 8,613,592 | B2 | 12/2013 | Elorza Gomez |
| 9,957,980 | B2 | 5/2018 | Englebert |
| 2005/0031454 | A1 | 2/2005 | Doloresco et al. |
| 2008/0152505 | A1 | 6/2008 | Burton et al. |
| 2009/0123276 | A1 | 5/2009 | Greim et al. |

(Continued)

FOREIGN PATENT DOCUMENTS

| | | | |
|---|---|---|---|
| CN | 112943382 | A | 6/2021 |
| DE | 102018202888 | A1 | 8/2019 |

(Continued)

*Primary Examiner* — Elton K Wong

(74) *Attorney, Agent, or Firm* — LEYDIG, VOIT & MAYER, LTD.

(57) ABSTRACT

A stator vane for a turbomachine, including an airfoil having a leading edge and a trailing edge, which are interconnected by a suction side and a pressure side, the airfoil extending substantially in a radial direction between an inner platform and an outer platform, wherein, when viewed in an axial direction of the turbomachine toward the trailing edge, the trailing edge extends so as to be inclined at a first angle to the pressure side radially on an outside in relation to the radial direction at a circumferential position at which the trailing edge meets the outer platform, and wherein the first angle between the trailing edge and a tangent to the outer platform at a transition from the outer platform to the trailing edge is between 72° and 84°.

13 Claims, 3 Drawing Sheets

(56) References Cited

U.S. PATENT DOCUMENTS

| | | | | |
|---|---|---|---|---|
| 2009/0257866 | A1* | 10/2009 | Greim | F01D 9/041<br>415/208.1 |
| 2010/0054946 | A1 | 3/2010 | Orosa et al. | |
| 2011/0164970 | A1 | 7/2011 | Greim et al. | |
| 2012/0243983 | A1 | 9/2012 | Breeze-Stringfellow et al. | |
| 2016/0341211 | A1* | 11/2016 | Gallagher | F01D 25/24 |
| 2019/0264568 | A1* | 8/2019 | Kislinger | F01D 5/142 |
| 2021/0156261 | A1 | 5/2021 | Karakasis | |
| 2021/0156340 | A1 | 5/2021 | Karakasis et al. | |

FOREIGN PATENT DOCUMENTS

| | | | |
|---|---|---|---|
| EP | 1333181 | A1 | 8/2003 |
| EP | 2075408 | A2 | 7/2009 |
| EP | 3467260 | A1 | 4/2019 |
| FR | 3050227 | B1 | 2/2020 |
| JP | 2008157250 | A | 7/2008 |
| JP | 5247361 | B2 | 7/2013 |
| WO | 2007001389 | A2 | 1/2007 |
| WO | 2009103528 | A2 | 8/2009 |
| WO | 2017127043 | A1 | 7/2017 |

* cited by examiner

STATOR VANE FOR A TURBOMACHINE

CROSS REFERENCE TO RELATED APPLICATIONS

This application claims benefit to German Patent Application No. DE 102022103319.8, filed on Feb. 11, 2022, which is hereby incorporated by reference herein.

FIELD

The invention relates to a stator vane for a turbomachine.

BACKGROUND

A turbomachine generally comprises a compressor portion, a combustor portion, and a turbine portion. The compressor portion progressively increases the pressure of a working fluid entering the turbomachine and supplies this compressed working fluid to the combustion portion. The compressed working fluid and a fuel mix together in the combustor portion and combust in a combustor to produce high-pressure and high-temperature combustion gases. The combustion gases flow from the combustor portion into the turbine portion, where they expand in order to carry out work.

The turbine portion comprises a plurality of stator nozzle rings comprising stator guide vanes positioned in the flow of the combustion gases. An airfoil of a stator vane of this kind extends within a gas duct from a radially inner platform radially outward to a radially outer platform. Vanes, in particular stator vanes, being excited to vibrate during operation can have disadvantageous effects, for example on the service life of the components concerned.

To reduce this excitation, inclined airfoils of vanes are known for turbomachines. A vane having circumferential inclination is known from DE 10 2018 202 888 A1, for example.

SUMMARY

In an embodiment, the present disclosure provides a stator vane for a turbomachine, comprising an airfoil having a leading edge and a trailing edge, which are interconnected by a suction side and a pressure side, the airfoil extending substantially in a radial direction between an inner platform and an outer platform, wherein, when viewed in an axial direction of the turbomachine toward the trailing edge, the trailing edge extends so as to be inclined at a first angle to the pressure side radially on an outside in relation to the radial direction at a circumferential position at which the trailing edge meets the outer platform, wherein the first angle between the trailing edge and a tangent to the outer platform at a transition from the outer platform to the trailing edge is between 72° and 84°. When viewed in the axial direction of the turbomachine, a connecting line through profile centers of gravity at 0% and 10% of a radially outwardly extending airfoil height of the stator vane is inclined by at most 10° relative to the radial direction through the profile center of gravity at 10% of the airfoil height. A visible edge of the leading edge has an arcuately curved extension over the airfoil height when viewed in the circumferential direction and is inclined radially outward and radially inward relative to the radial direction.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
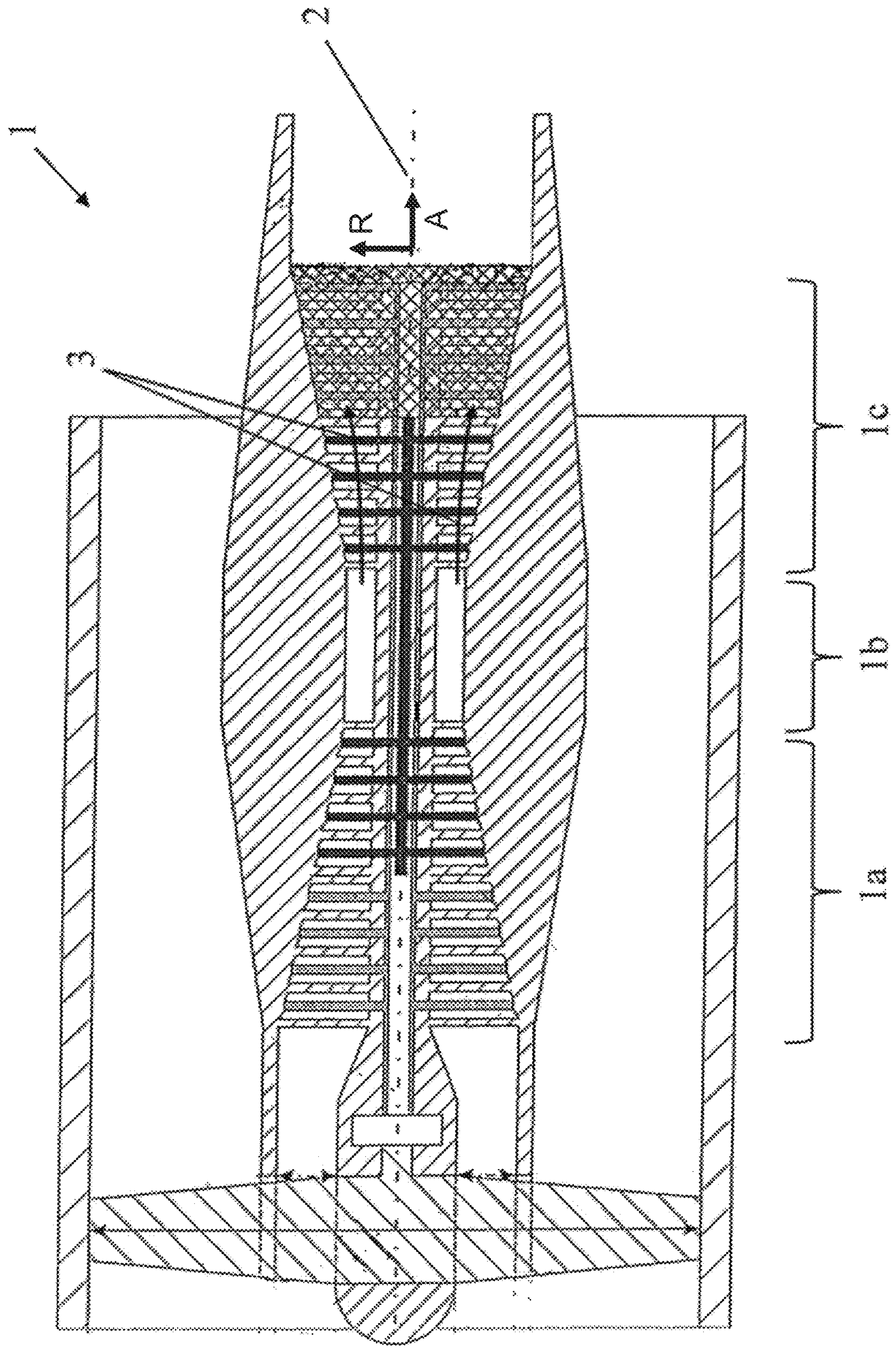
FIG. 1 illustrates a schematic axial section through an exemplary turbomachine according to an embodiment of the invention.

In an embodiment, the present invention provides an improved stator vane for a turbomachine by means of which excitation to vibrate during operation can be reduced.

A stator vane is provided for a turbomachine, in particular for an aircraft engine, in particular for a turbine stage, preferably a high-speed and/or low-pressure turbine stage, of an aircraft engine, comprising an airfoil having a leading edge and a trailing edge, which are interconnected by a suction side and a pressure side, the airfoil extending substantially in the radial direction between an inner platform or inner shroud segment and an outer platform or outer shroud segment. When viewed in the axial direction of the turbomachine toward the trailing edge, the trailing edge extends so as to be inclined at a first angle $\alpha$ to the pressure side radially on the outside in relation to the radial direction at a circumferential position at which the trailing edge meets the outer platform, the first angle $\alpha$ between the trailing edge and a tangent to the outer platform at a transition from the outer platform to the trailing edge being between 72° and 84°, preferably between 74° and 82°, in particular between 76° and 80°. When viewed in the axial direction of the turbomachine, a connecting line through the profile centers of gravity at 0% and 10% of a radially outwardly extending airfoil height of the stator vane is inclined by at most 10° relative to a radial direction through the profile center of gravity at 10% of the airfoil height. A visible edge of the leading edge has an arcuately curved extension over the airfoil height when viewed in the circumferential direction and is inclined radially outward and radially inward relative to the radial direction.

The first angle $\alpha$ can bring about translocation of the trailing edge and/or leading edge, in particular in its extension radially outward, relative to the radial direction, thereby causing an inclination in the axial direction of the turbomachine. This inclination in the axial direction is also referred to as a 'bow' of the stator vane or airfoil. As a result, at least one portion of the trailing edge and/or leading edge, in particular the portion close to the outer platform and/or remote from the inner platform, can be arranged so as to be offset in a downstream direction, thereby making it possible to reduce a vibratory load on the stator vane caused by the wake of a rotor blade assembly arranged upstream. The airfoil height of the stator vane corresponds to the duct height in the region of the turbomachine in which the stator vane is arranged.

The connecting line through the profile centers of gravity extends in particular through the centers of gravity of cross-sectional areas of the airfoil. Because this connecting line is inclined by at most 10° relative to the radial direction through the profile center of gravity at 10% of the airfoil height, the airfoil or stator vane has an inclination in the circumferential direction of the turbomachine, in particular in a pressure-side direction. This inclination in the circumferential direction is also referred to as a 'lean' of the stator vane or airfoil. This can make it possible to decouple the trailing and/or leading rotor blade row or rotor blade assembly and/or the stator vane itself, or to reduce the excitation thereof.

It has been found that combined inclination in the circumferential and axial directions can significantly reduce the excitation in comparison with inclination only in the circumferential direction. Therefore, a stator vane or airfoil which has both a 'lean' and a 'bow' can provide an advantageous compromise between low vibration excitation, favorable aerodynamics, and compactness of the structure, and in particular an associated reduction in weight.

The circumferential inclination, which is largely radially outward toward the pressure side, allows for lower excitation of the trailing and/or leading rotor blade row and simultaneously also of the stator vane itself, with the low radially inward circumferential inclination making it possible to reduce the losses on the stator vane in the hub region, which has advantages in terms of aerodynamics.

Owing to the arcuately curved extension, the vibratory load on the stator vane caused by the wake of the upstream rotor blade array can be reduced by offsetting the leading edge in the downstream direction over the majority of the radial extent, while at the same time the axial spacing from the adjacent upstream rotor blade ring can be kept low at the suspension points radially on the inside and outside. This allows for a space-saving, weight-saving, axially compact arrangement. The stator vane according to an embodiment of the invention thus provides an advantageous compromise between low excitation, favorable aerodynamics, and compactness of the structure (weight), and is therefore advantageous in terms of efficiency and vibratory load.

In particular, in this case, the first angle $\alpha$ and/or the second angle $\theta$ is/are determined such that, during operation of the stator vane or turbomachine, excitation caused by the wake of the adjacent upstream rotor blade array is reduced. Preferably, the inclinations in the circumferential and axial directions extend in the radial direction such that the excitation is reduced. In an aircraft engine, an operating state may be the aerodynamic design point (ADP) state and/or the operating state at cruising altitude ('cruise condition'), for example. Preferably, the inclinations in the circumferential and axial directions extend in the radial direction such that the excitation is reduced.

An embodiment of the invention thus in particular relates to a stator vane for a turbomachine, in particular an aircraft engine, in particular a turbine stage, in particular a low-pressure turbine stage, of the aircraft engine, comprising an airfoil which is inclined both in the circumferential direction and in the axial direction at least in some portions such that, in the relevant operating state, excitation caused by the wake of the adjacent upstream rotor blade array is reduced.

By means of its rotational axis, a turbomachine defines an axial direction, a radial direction perpendicular to the axial direction, and a circumferential direction extending concentrically around the axial direction. The stator vane or airfoil extends radially between an inner platform of a stator vane assembly and an outer platform of the stator vane assembly. The airfoil comprises a leading edge, which extends from the inner platform to the outer platform, and a trailing edge, which is arranged downstream of the leading edge in a flow direction and extends from the inner platform to the outer platform. The suction side and the pressure side extend between the leading edge and the trailing edge and are arranged opposite one another.

The turbomachine comprises a turbine or turbine portion, which can comprise a high-pressure turbine and/or a low-pressure turbine, for example. In this case, a turbine comprises a plurality of stages, with each stage comprising a stationary stator vane assembly and a subsequent downstream rotor blade assembly arranged so as to be rotatable about the rotational axis of the turbomachine. A stator vane assembly of this kind comprises one or more stator vane segments having at least one stator vane, a stator vane assembly in particular comprising a plurality of identically constructed stator vanes over its circumference.

According to a further aspect, there is proposed a stator vane segment or cluster comprising exactly one, exactly two, exactly three, exactly four, exactly five or more stator vanes according to an embodiment described herein.

Accordingly, there is also proposed a stator vane segment or cluster comprising at least one or more stator vanes as proposed herein, and a turbine stage, in particular a low-pressure turbine stage, in particular a high-speed low-pressure turbine stage, comprising a stator vane of this kind. 'High-speed' means that the turbine stage is coupled to the fan via a transmission and rotates faster than the fan during operation.

According to a further aspect, there is proposed a turbine stage, in particular a low-pressure turbine stage, in particular a high-speed low-pressure turbine stage, which comprises a stator vane ring comprising a stator vane and/or a stator vane segment or cluster according to an embodiment described herein. A high-speed low-pressure turbine stage is in particular configured such that the turbine stage is coupled to a turbine-driven fan via a transmission and rotates faster than the fan during operation. In particular, each stator vane or stator vane segment of the stator vane ring can be constructed according to an embodiment of the invention.

According to a further aspect, there is proposed an airfoil assembly for a turbomachine, wherein at least one stator vane segment according to an embodiment described herein is arranged between two rotor rings or rotor blade assemblies, in particular within a turbine stage according to an embodiment described herein, in particular of a low-pressure turbine and/or high-speed turbine of an aircraft engine.

An embodiment of the invention is based, inter alia, on the concept of adapting a stator vane of a stator vane assembly or a stator vane array to a wake of a rotor blade assembly or rotor blade array arranged upstream thereof in order to make it possible to reduce excitation of the rotor blade array and/or the rotor blade assembly. It is proposed to adapt the excited, downstream stator vane array to the wake of the upstream rotor blade array.

As a result, changes to the wake of the upstream rotor blade array caused by adapting the upstream rotor blade array to the downstream stator vane array can be avoided. The advantage of this is that the rotor blades of the rotor blade array, which are designed to fulfill various design criteria, need not be modified to the detriment of these design criteria, which may include force balance between aerodynamic gas forces and centrifugal forces, for example.

It may be advantageous to incline the downstream stator vanes instead of the rotating rotor blades. This inclination shifts the center of gravity, resulting in structural and mechanical drawbacks when inclining the rotor blades. Therefore, it may be disadvantageous to additionally incline the rotor blades.

In an embodiment, the connecting line through the profile centers of gravity at 0% and 10%, preferably at 0% and 15%, in particular at 0% and 24%, of a or the radially outwardly extending airfoil height is inclined by at most 10°, preferably at most 5°, to the radial direction through the 0% profile center of gravity. The stator vane or airfoil is thus inclined toward its pressure side, and in particular not toward the suction side, as a result of which the stator vane can be provided with aerodynamic advantages which can result in a reduction in power losses at the stator vane in the hub region of a stator vane assembly.

In an embodiment, a circumferential spacing at 90% of a duct height of the turbomachine between the circumferential position of a first profile center of gravity of the stator vane at 10% of the radially outwardly extending airfoil height and the circumferential position of a second profile center of gravity of the stator vane at 90% of the radially outwardly extending airfoil height is at least 0.3 times, in particular 0.6 times, and/or at most 2 times, in particular 1.2 times, a minimum airfoil spacing at 90% of the duct height, in particular at the location of the stator vane. In this case, the circumferential position of the second profile center of gravity is in particular offset from the circumferential position of the first profile center of gravity toward the pressure side or preferably toward the suction side.

Here, the circumferential spacing can in particular be provided along an arc of a circle between the relevant circumferential positions of the respective profile centers of gravity. The minimum airfoil spacing can also be referred to as a 'throat,' which corresponds to the diameter of the smallest circle that can be inscribed at the relevant radial height between the pressure side and suction side of adjacent airfoils, tangentially thereto, the center of the circle in particular being located at the relevant duct height.

In an embodiment, when viewed in the circumferential direction, the visible edge of the leading edge encloses a second angle (γ) with the radial direction in some portions, the second angle (γ) being in a range from 4° to 16°, in particular in a range from 7° to 13°, at the inner platform and/or in a range from 12° to 24°, in particular in a range from 15° to 21°, at the outer platform. As a result, an inclination of the stator vane or airfoil in the axial direction can be formed in a radially inner region, which makes it possible to reduce a vibratory load on the stator vane, or a stator vane assembly comprising a stator vane of this kind, caused by the wake of a rotor blade assembly arranged upstream. In addition, a configuration of this kind can allow for a compact arrangement of the stator vane(s) on an inner platform, meaning that space and weight savings can be made.

This makes it possible to arrange the leading edge in a direction downstream, or to offset the leading edge in the downstream direction, in particular over the majority of its radial extent. This allows for a compact arrangement of stator vanes on an outer platform, meaning that space and weight savings can be made.

In an embodiment, when viewed in the circumferential direction, a visible edge of the trailing edge encloses a third angle δ, at least in some portions, relative to the radial direction at the circumferential position at which the trailing edge meets the outer platform. In particular, when viewed in the axial direction toward the trailing edge, a further angle between the trailing edge and a tangent to an outer platform or a radially outer annular-space wall of the turbomachine is between 72° and 84°, preferably between 74° and 82°, and in particular between 76° and 80°. Therefore, a greater inclination can be provided in a radially outer region of the stator vane or airfoil, as a result of which lower excitation of a trailing and/or leading rotor blade assembly and the stator vane or airfoil can be achievable.

In an embodiment, the line of sight of the leading edge and/or of the trailing edge when viewed in the circumferential direction has a curvature, in particular having the same sign, over at least 50%, in particular at least 60%, in particular at least 70%, in particular at least 80%, in particular at least 90%, of the radial airfoil height or over the entire radial airfoil height. In particular, when viewed in the circumferential direction of the turbomachine, the inclination extension in the axial direction, in particular the extension of a leading edge line of sight and/or a trailing edge line of sight in the radial direction, has an arcuate extension. The excitation can be reduced further by this curved or arcuate extension of the stator vane or airfoil. In this case, the extension of the stator vane or airfoil can, alternatively or additionally, be formed such that an inclination toward the radial direction has an opposite orientation at a radially inner airfoil end and/or at a radially outer airfoil end, this extension between the ends being continuous, in particular without any change in curvature, or the radially inner and outer contours of the leading edge line of sight and/or trailing edge line of sight merging into one another.

Further features, advantages and possible uses of embodiments of the invention will become clear from the following description.

FIG. 1 is an axial section through an embodiment example of a turbomachine 1 according to an embodiment of the invention, which, by way of example, is a turbofan engine in this case. The turbomachine 1 is functionally divided into a compressor 1*a*, a combustor 1*b*, and a turbine 1*c*. Both the compressor 1*a* and the turbine 1*c* are made up of a plurality of stages, each stage being composed of a stator vane assembly and a rotor blade assembly arranged downstream in the flow direction. A turbine stage of this kind, in particular a low-pressure turbine stage, in particular a high-speed low-pressure turbine stage, can comprise a stator vane according to an embodiment of the invention and/or a stator vane cluster according to an embodiment of the invention.

During operation, the rotor blade assemblies rotate about the longitudinal axis 2 of the turbomachine 1. The intake air is compressed in the compressor 1*a*, and is then mixed and combusted with fuel in the downstream combustor 1*b*. The resulting flow flows through a hot gas duct 3, thereby driving the rotor blade assemblies arranged therein that rotate about the longitudinal axis 2.

Figure 2A:
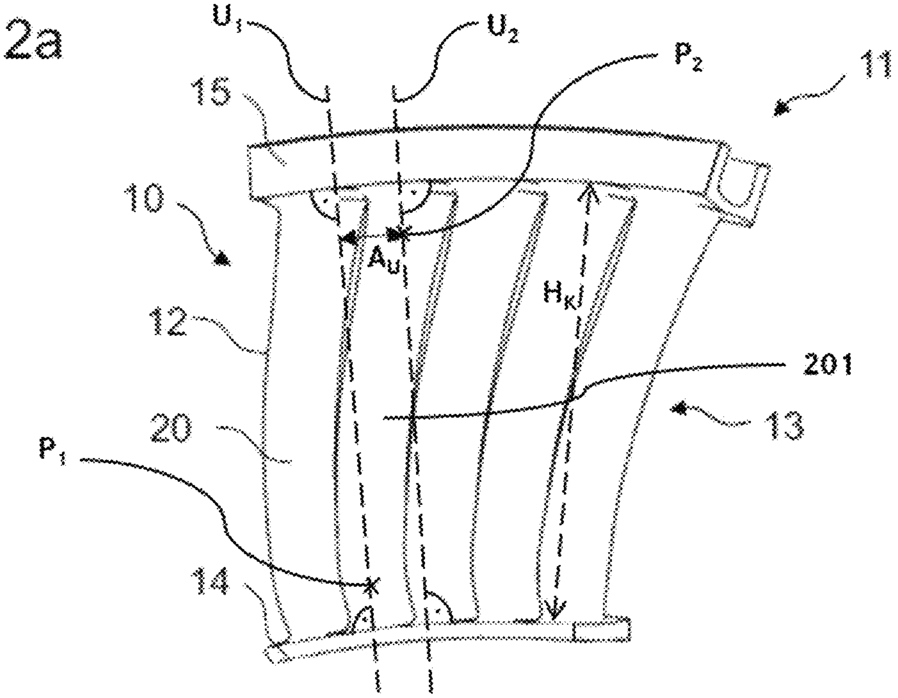
FIGS. 2*a* and 2*b* schematically illustrate an exemplary stator vane cluster according to an embodiment of the invention and of a stator vane according to an embodiment of the invention, respectively.

FIG. 2*a* is a schematic illustration of an embodiment example of a stator vane cluster 11 or stator vane segment according to an embodiment of the invention, comprising a number of stator vanes 10 according to an embodiment of the invention, viewed in the axial direction toward trailing edges 12 of the stator vanes 10 or the airfoils 20 thereof.

A stator vane cluster 11 of this kind can be part of a stator vane assembly or stator vane ring. At least one stator vane segment of this kind can be arranged between two rotor rings or rotor blade assemblies, in particular within a turbine stage described herein.

An airfoil 20 of a stator vane 10 comprises a leading edge, the leading edge and trailing edge 12 being interconnected by a suction side and a pressure side 13. The airfoil 20 extends substantially in the radial direction in relation to a longitudinal turbomachine axis 2 between an inner platform 14 and an outer platform 15.

Figure 2B:
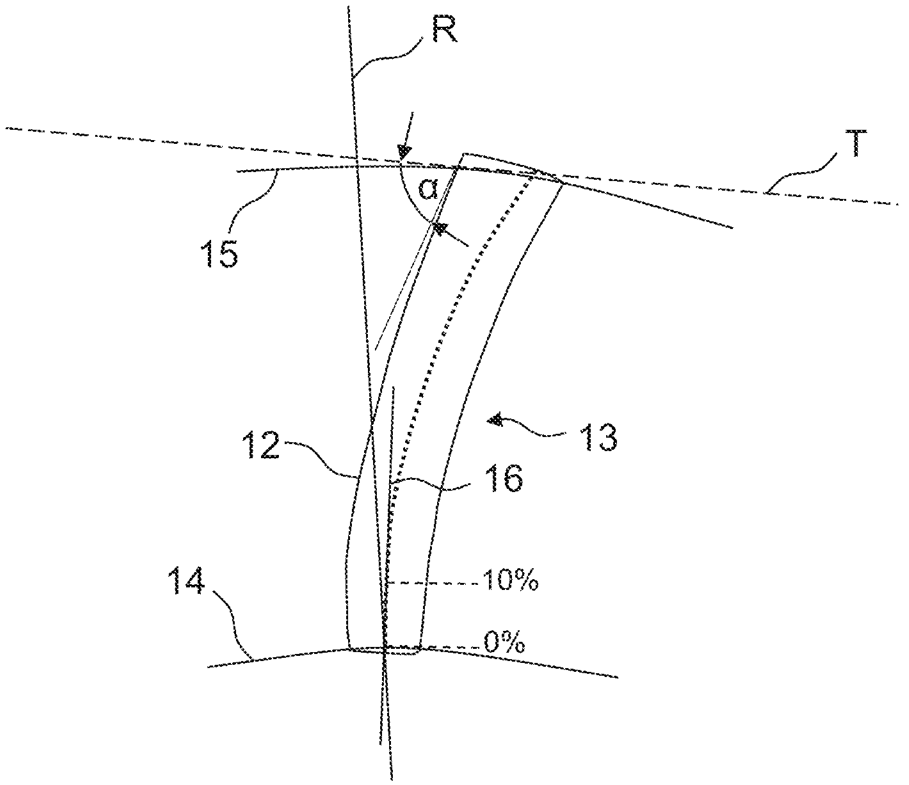

FIG. 2*b* is a schematic illustration of an airfoil 20 of a stator vane 10 according to an embodiment of the invention from FIG. 2*a*, viewed in the axial direction of the turbomachine. At a circumferential position at which a trailing edge 12 meets the outer platform 15, the trailing edge 12 extends so as to be inclined at a first angle α radially outward toward the pressure side in relation to the radial direction R. This first angle α is enclosed between the trailing edge 12 and a tangent T to the outer platform 15 at a transition from the outer platform 15 to the trailing edge 12 and can be between 72° and 84°, preferably between 74° and 82°, in particular between 76° and 80°. The inclination thus caused in the axial direction is also referred to as a 'bow' of the stator vane or airfoil.

A connecting line 16 through the profile centers of gravity at 0% and 10% of a radially outwardly extending airfoil height of the stator vane (10) is inclined by at most 10° to a radial direction (R) through the profile center of gravity at 10% of the airfoil height, as a result of which the stator vane 10 has an inclination in the circumferential direction or a so-called 'lean'. The connecting line 16 through the profile centers of gravity extends through the centers of gravity of cross-sectional areas of the airfoil 20.

In this case, the connecting line 16 through the profile centers of gravity at 0% and 10%, preferably at 0% and 15%, in particular at 0% and 24%, of a radially outwardly extending airfoil height can be inclined by at most 10°, and preferably at most 5°, to the radial direction through the 0% profile center of gravity. This can produce the inclination in the circumferential direction of the turbomachine 1, as a result of which the airfoil 20 or the stator vane airfoil 10 and/or a stator vane assembly can be decoupled or the vibration thereof reduced.

A further airfoil 201 shown in FIG. 2*a* has a first profile center of gravity $P_1$ at 10% of the radially outwardly extending airfoil height and a second profile center of gravity $P_2$ at 90% of the radially outwardly extending airfoil height. The circumferential position $U_1$ of the first profile center of gravity $P_1$ lies on a straight line $U_1$ extending radially through the first profile center of gravity $P_1$ or corresponds to this straight line $U_1$. The circumferential position $U_2$ of the second profile center of gravity $P_2$ lies on a straight line $U_2$ extending radially through the second profile center of gravity $P_2$ or corresponds to this straight line $U_2$.

At 90% of a duct height $H_K$ in the region of the airfoil 201, a circumferential spacing Au (along an arc of a circle) between the circumferential position $U_1$ of the first profile center of gravity $P_1$ and the circumferential position $U_2$ of the second profile center of gravity $P_2$ is at least 0.3 times, in particular 0.6 times, and/or at most 2 times, in particular 1.2 times, a minimum airfoil spacing at 90% of the duct height $H_K$.

In the example in FIG. 2*a*, the circumferential position $U_2$ of the second profile center of gravity $P_2$ is offset from the circumferential position $U_1$ of the first profile center of gravity $P_1$ toward the pressure side 13.

Alternatively, in a preferred embodiment, the circumferential position $U_2$ of the second profile center of gravity $P_2$ may also be offset from the circumferential position $U_1$ of the first profile center of gravity $P_1$ toward the suction side.

Figure 3A:
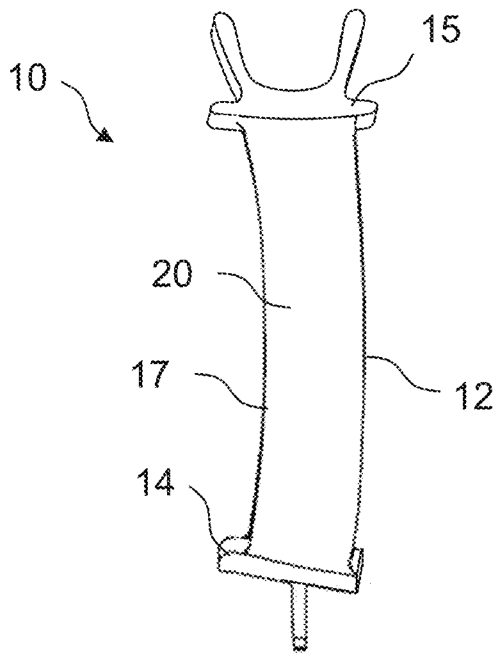
FIGS. 3*a* and 3*b* schematically illustrate an exemplary stator vane according to an embodiment of the invention, viewed in the circumferential direction of the turbomachine.

FIG. 3*a* is a schematic illustration of the embodiment example of a stator vane 10 according to an embodiment of the invention, viewed in the circumferential direction of a turbomachine 1.

The leading edge 17 and trailing edge 12 of the airfoil 20 of the stator vane 10 extend substantially in the radial direction between the inner platform 14 and the outer platform 15. The leading edge 17 and the trailing edge 12 or the lines of sight thereof clearly extend in a curved or arcuate manner. In this case, the line of sight of the leading edge 17 and/or the trailing edge 12 when viewed in the circumferential direction can have a curvature, in particular having the same sign, over at least 50%, in particular at least 60%, in particular at least 70%, in particular at least 80%, in particular at least 90%, of a radial airfoil height or over the entire radial airfoil height. As shown in FIG. 3*a*, the curvatures of the leading edge 17 and the trailing edge 12 have the same sign, i.e., are curved in the same direction.

Figure 3B:
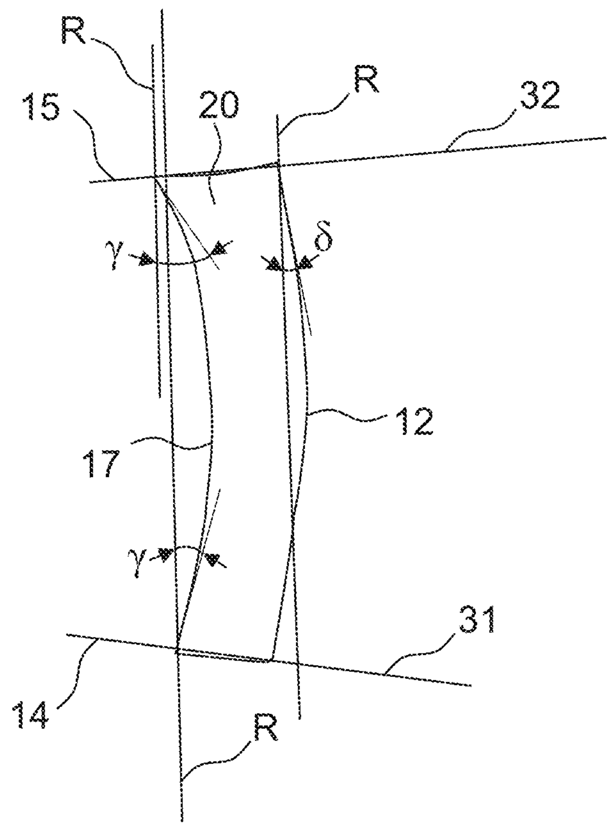

FIG. 3*b* is a schematic illustration of an airfoil 20 of a stator vane 10 according to an embodiment of the invention from FIG. 3*a* viewed in the circumferential direction, the airfoil 20 extending from the radially inner annular-space wall 31 of the turbomachine 1 to a radially outer annular-space wall 32 of the turbomachine 1.

A visible edge of the leading edge 17 encloses a second angle γ relative to the radial direction R, at least in some portions. In this case, an inclination of the stator vane 10 in the axial direction or a 'bow' can be brought about, such that the leading edge 17 and/or the trailing edge 12 can be arranged offset in a downstream direction so that a vibratory load on the stator vane 10 caused by the wake of a rotor blade assembly arranged upstream can be reduced.

Here, the second angle γ can be in a range from 4° to 16°, in particular in a range from 7° to 13°, at the inner platform 14 and can be in a range from 12° to 24°, in particular in a range from 15° to 21°, at the outer platform 15. Alternatively or additionally, when viewed in the circumferential direction, the visible edge of the trailing edge 12 can enclose a third angle δ, at least in some portions, relative to the radial direction R.

For illustration purposes, the figures are depicted with disproportionate inclination.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Turbomachine
1*a* Compressor

1*b* Combustor
1 c Turbine
2 Longitudinal axis
3 Hot gas duct
10 Stator vane
11 Stator vane cluster
12 (Line of sight of the) trailing edge
13 Pressure side
14 Inner platform
15 Outer platform
16 Connecting line through profile centers of gravity
17 (Line of sight of the) leading edge
20 Airfoil
31 Radially inner annular-space wall
32 Radially outer annular-space wall
A Axial direction of the turbomachine
R Radial direction of the turbomachine

The invention claimed is:

1. A stator for a turbomachine, comprising:
a plurality of stator vanes, each comprising:
an airfoil having a leading edge and a trailing edge, which are interconnected by a suction side and a pressure side, the airfoil extending substantially in a radial direction between an inner platform and an outer platform,
wherein, when viewed in an axial direction of the turbomachine toward the trailing edge, the trailing edge extends so as to be inclined at a first angle radially on an outside in relation to the radial direction at a circumferential position at which the trailing edge meets the outer platform,
wherein the first angle between the trailing edge and a tangent to the outer platform at a transition from the outer platform to the trailing edge is between 72° and 84°,
wherein, when viewed in the axial direction of the turbomachine, a connecting line through profile centers of gravity at 0% and 10% of a total radially outwardly extending airfoil height of the stator vane is inclined by at most 10° relative to the radial direction through the profile center of gravity at 10% of the total airfoil height,
wherein a visible edge of the leading edge has an arcuately curved extension over the airfoil height when viewed in a circumferential direction, the arcuately curved extension of the visible edge of the leading edge, when viewed in the circumferential direction, being partially inclined away from the radial direction toward the axial direction and the trailing edge at a first portion and a second portion,
wherein each respective stator vane has a minimum airfoil spacing, which is defined as a throat between the respective stator vane and a circumferentially adjacent stator vane of the plurality of stator vanes, and
wherein a circumferential spacing at 90% of the total radially outwardly extending airfoil height of the stator vane between a circumferential position of a first profile center of gravity of the stator vane at 10% of the radially outwardly extending airfoil height and a circumferential position of a second profile center of gravity of the stator vane at 90% of the radially outwardly extending airfoil height is at least 0.3 times the minimum airfoil spacing at 90% of the total radially outwardly extending airfoil height of the stator vane, the circumferential position of the second profile center of gravity being offset from the circumferential position of the first profile center of gravity toward the pressure side or toward the suction side.

2. The stator according to claim 1, wherein the connecting line through the profile centers of gravity at 0% and 10% of the radially outwardly extending airfoil height is inclined by at most 10° to the radial direction through the 0% profile center of gravity.

3. The stator according to claim 2, wherein the connecting line through the profile centers of gravity at 0% and 24% of the radially outwardly extending airfoil height is inclined by at most 5° to the radial direction through the 0% profile center of gravity.

4. The stator according to claim 1, wherein, when viewed in the circumferential direction, the visible edge of the leading edge encloses a second angle with the radial direction in some portions, the second angle being in a range from 4° to 16° at the inner platform, and/or being in a range from 12° to 24° at the outer platform.

5. The stator according to claim 4, wherein the second angle is in a range from 7° to 13° at the inner platform and/or in a range from 15° to 21° at the outer platform.

6. The stator according to claim 1, wherein, when viewed in the circumferential direction, a visible edge of the trailing edge encloses a third angle, at least in some portions, relative to the radial direction at a circumferential position at which the trailing edge meets the outer platform.

7. The stator according to claim 1, wherein a line of sight of the leading edge and/or of the trailing edge when viewed in the circumferential direction has a curvature over at least 50% of the radial airfoil height or over the entire radial airfoil height.

8. The stator according to claim 7, wherein the curvature is over 90% of the radial airfoil height.

9. A turbine stage comprising a stator vane ring comprising the stator according to claim 1.

10. An airfoil assembly for a turbomachine, comprising the turbine stage according to claim 9.

11. The stator according to claim 1, wherein the first angle between the trailing edge and the tangent to the outer platform at the transition from the outer platform to the trailing edge is between 76° and 80°.

12. The stator according to claim 1, wherein the circumferential position of the second profile center of gravity of the stator vane at 90% of the radially outwardly extending airfoil height is at least 0.6 times and/or at most 1.2 times a minimum airfoil spacing at 90% of the airfoil height.

13. The stator according to claim 1, wherein the circumferential spacing at 90% of the total radially outwardly extending airfoil height of the stator vane between the circumferential position of the first profile center of gravity of the stator vane at 10% of the radially outwardly extending airfoil height and the circumferential position of the second profile center of gravity of the stator vane at 90% of the radially outwardly extending airfoil height is at most 2 times the minimum airfoil spacing at 90% of the total radially outwardly extending airfoil height of the stator vane.

* * * * *